United States Patent [19]

Doman

[11] 4,004,757
[45] Jan. 25, 1977

[54] OSCILLATION DAMPER FOR THE HUB OF A ROTORCRAFT ROTOR AND ITS COMBINATION WITH A ROTORCRAFT

[75] Inventor: Glidden S. Doman, West Chester, Pa.

[73] Assignee: William Gallagher, West Chester, Pa.

[22] Filed: Oct. 16, 1975

[21] Appl. No.: 623,008

[52] U.S. Cl. .............................. 244/17.13; 416/31; 416/500; 244/76 R
[51] Int. Cl.² ........................................ B64C 11/44
[58] Field of Search ......... 244/17.11, 17.13, 17.27, 244/76 R, 76 C, 83 D, 85, 83 G, 80, 78; 74/574; 73/455, 457, 462; 248/20, 358; 188/1 B; 137/38, 45, 46; 46/31, 500

[56] References Cited

UNITED STATES PATENTS

| | | | |
|---|---|---|---|
| 2,568,401 | 9/1951 | Lynn et al. | 137/45 |
| 2,687,856 | 8/1954 | Doman | 244/17.13 |
| 2,743,071 | 4/1956 | Kelley | 244/17.13 |
| 2,919,081 | 12/1959 | Schon | 244/17.13 |
| 2,966,124 | 12/1960 | Casey | 248/20 |
| 3,042,343 | 10/1956 | Cooke et al. | 137/45 |
| 3,477,665 | 11/1969 | Legrand | 244/17.27 |
| 3,533,425 | 10/1970 | Hannan | 137/46 |
| 3,795,375 | 3/1974 | Lemnios | 416/31 |
| 3,938,762 | 2/1976 | Murphy | 244/17.13 |

FOREIGN PATENTS OR APPLICATIONS

| | | | |
|---|---|---|---|
| 601,999 | 5/1948 | United Kingdom | 244/17.13 |

Primary Examiner—Trygve M. Blix
Assistant Examiner—Galen L. Barefoot
Attorney, Agent, or Firm—John M. Montstream

[57] ABSTRACT

A rotorcraft is subject to a rocking motion when on the ground, which is called ground resonance, and in the air which gives the fuselage a waddle type of motion about its center of gravity, both are a form of aeromechanical instability. This fuselage motion is coupled with and accompanied by bending oscillations of the blades with respect to the hub of the rotor of the rotorcraft. An oscillation damper is described which damps the oscillations of the aircraft and thereby eliminates or substantially reduces the rocking and waddle motion of the fuselage. The damper includes a seismic device having a mass-spring combination tuned to the frequency of the rocking motion which will typically be one half or approximately one half of the rotor revolutions per minute at cruising speed and is positioned laterally of and spaced from the center of gravity of the fuselage. The movement of the weight in response to fuselage motion operates a control and the control operates a motor which expands and contracts in response thereto. The motor is connected with the swash plate to change the pitch of the blades of the rotor in proper phase relation with the hub oscillation and thereby provide a vector force which damps the oscillations. The control particularly illustrated is a pair of fluid valves and the motor is a fluid motor.

18 Claims, 6 Drawing Figures

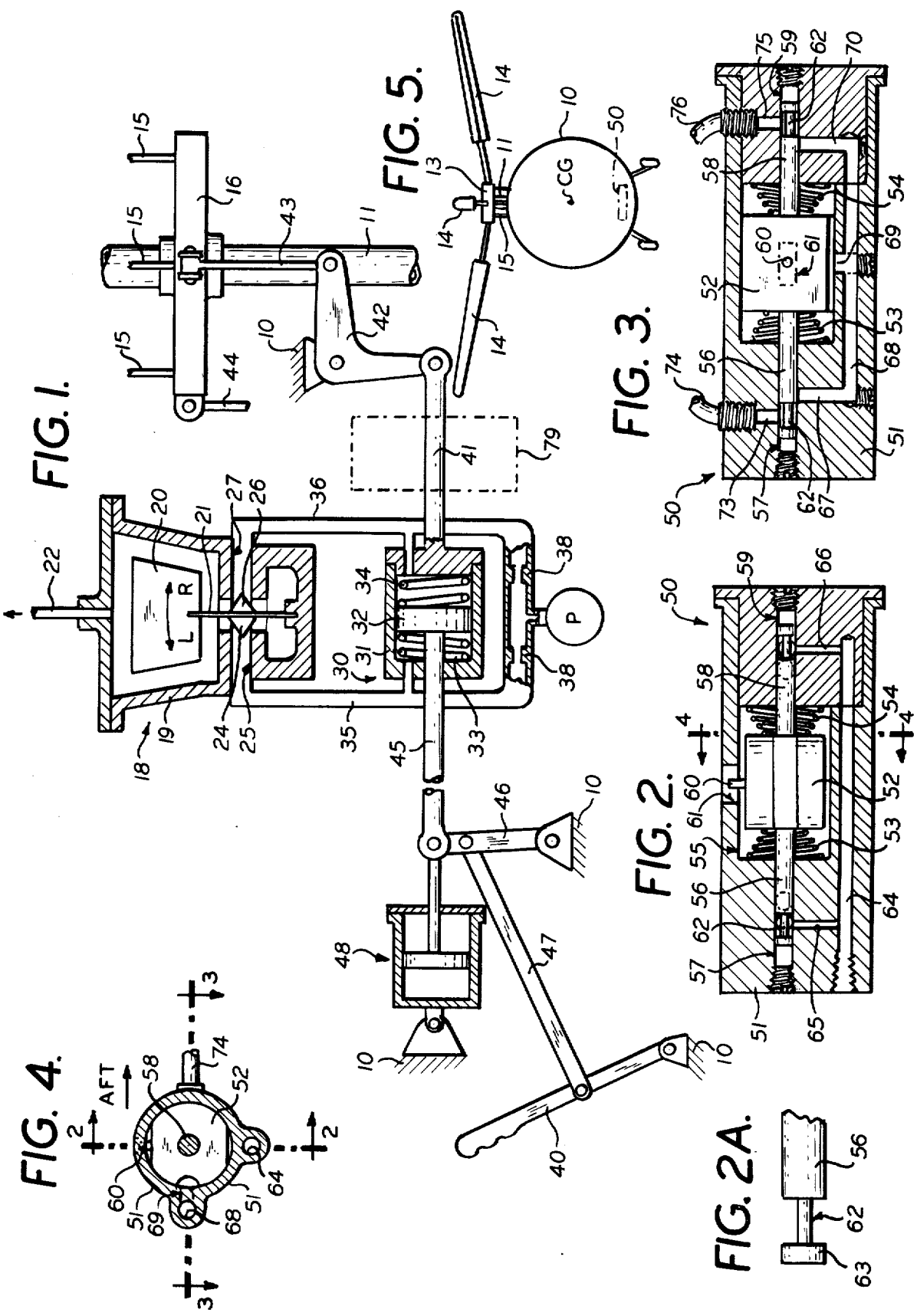

4,004,757

OSCILLATION DAMPER FOR THE HUB OF A ROTORCRAFT ROTOR AND ITS COMBINATION WITH A ROTORCRAFT

The ground resonance or instability and the waddle motion of the fuselage of a rotorcraft when in flight is at a relatively low frequency which, depending on the design parameter of the rotorcraft will be approximately half or less than half of the rotor revolutions per minute, or r.p.m. and features an oscillation of the hub of the rotor in a horizontal plane. The hub oscillation is principally in a lateral direction and it accompanies the fuselage oscillation or motion about its center of gravity with the same low frequency. The hub oscillation damper described herein damps the aircraft oscillation by causing a properly timed corrective angular motion of the rotor thrust vector with respect to the rotorcraft center of gravity.

An object of the invention is to construct an oscillation damper for the hub of the rotor of a rotorcraft the blades of which are connected with a swash plate for cyclic feathering thereof to damp the rotorcraft oscillation through changes in blade feathering so that these oscillations are eliminated or substantially damped by corrective motions of the rotor thrust vector.

Another object is as above and to construct a damper using a seismic device including a weight and spring means tuned to the frequency of the aeromechanical stability at cruising r.p.m. which device controls the elongation and contraction of a link connected with the swash plate.

Again the objects are as above with the rotorcraft damping means in combination with the rotorcraft and an effective location for the seismic device in the craft so as to be responsive to the fuselage vibration or oscillation.

A further object is as above in which a fluid system of hub damping means is used having valves controlled by the seismic device which valves control a fluid motor forming the elongating and contracting element.

Other objects of the invention will be more apparent from the following description when taken in connection with the accompanying drawings illustrating preferred embodiments thereof in which:

FIG. 1 is a section through one form of rotorcraft damping means;

FIG. 2 is a section taken on line 2—2 of FIG. 4 through a seismic device and fluid valves of another form of construction;

FIG. 2A is an enlarged view of a valve;

FIG. 3 is a section taken on line 3—3 of FIG 4;

FIG. 4 is a section taken on line 4—4 of FIG. 2; and

FIG. 5 is a view of a rotorcraft.

A rotorcraft has a fuselage and frame 10 and a pylon 11 upon which a rotor is carried and rotated to provide the lift and directional movement of the craft. The rotor is rotated at a desired revolutions per minute, r.p.m., at cruising speed, such as 220 r.p.m. The rotor includes a rotor hub 13 which carries outwardly extending blades 14, four being shown. Each blade is feathered cyclicly in known manner, once per revolution by a connecting rod 15 connected with a swash plate 16 carried by the pylon in any known manner. In an aeromechanical instability of the rotorcraft this rotor hub oscillates in a horizontal plane and principally, though not always, in a lateral direction with respect to the fuselage. The hub oscillations set up the ground resonance or instability of the fuselage when the craft is on the ground and the waddle type of motion when the craft is in flight.

The hub damper includes a seismic device 18 having a housing 19 in which is mounted a weight 20 for oscillation therein and a seismic spring means 21 which carries and centralizes the weight in the housing. In the form of seismic device illustrated in FIG. 1 one end of the spring means is secured to the weight and the other end is secured to the housing thereby mounting the weight for free oscillation as determined by the resiliency of the spring and the mass of the weight. This seismic device of weight and spring means is tuned to or approximately to the frequency of the lateral aeromechanical instability a frequency which is approximately one half of the rotor r.p.m. or less at cruising speed. The seismic device is therefor, resonant or responsive to this frequency. Tuning of the seismic device to a predetermined frequency is accomplished in known fashion by changing the mass of the weight or the resiliency of the spring means or both. Preferably the housing has a fluid outlet 22 at the top of the housing so that the weight oscillates in a bath of oil.

The seismic device controls the opening and closing of a pair of valves and preferably is connected with the valves to directly open and close the same. The movement of the weight 20 in one direction from its central position opens a first valve and closes the other or second valve. In the form shown in FIG. 1, the first valve 24 is a metering cone carried by the seismic spring 21 on one side thereof such that movement of the weight to the right (R) partly opens or fully opens, depending upon the extent of movement of the weight, a port or valve opening formed by the end of the conduit or passage 25 in the housing. The second valve is a metering cone valve 26 carried by the seismic spring means 21 on the other side thereof from the first valve so that movement of the weight 20 to the right closes or partially closes the valve opening or port at the end of the conduit or passage 27. When the weight moves to the left (L), the first valve partly or fully closes valve opening or part 25 and valve 24 opens valve opening or port 27.

The motor means is shown as a fluid motor 30 having a cylinder member 31 which receives a piston member 32 therein and divides the cylinder member into two chambers. The piston member is centralized in the cylinder member by motor spring means 33 in one chamber and a like spring means 34 in the other chamber. One chamber is connected with the conduit 25 and its valve opening by a fluid connection 35 and the other chamber is connected by a fluid connection 36 to the conduit or passage 27 and its valve opening or port. A fluid or oil pump P is adapted to be connected with the connections 35 and 36 when fully assembled which preferably have orifices or restrictions 38 in each connection. The motor forms an expanding and contracting element in the linkage between 40 and the swash plate 16 in that the movement of the cylinder member to the right lengthens the element and movement of the cylinder to the left contracts the element. It is immaterial whether the piston member of the cylinder member is directly connected with the swash plate and the other member connected with the stick.

The motor 30 is connected with the swash plate 16 either in parallel or series with the pilot stick linkage. It is shown connected in series with one member, shown as the cylinder member 31, connected by a link 41, lever 42 and push rod 43 with the swash plate. Push rod 43 is connected on the lateral side of the swash plate as distinguished from a fore and aft located push rod 44. The other member, shown as the piston member, is connected with the stick 40 through suitable means such as piston red 45, lever 46 and line 47. A pilot control and feel device preferably is connected with the stick linkage to the swash plate. The motor spring means 33, 34 is stiff or strong enough so that it yields very little under the normal pressures exerted by the pilot from the stick 40 to shift the swash plate in flying and maneuvering the craft. The fluid pressure supplied by the pump P must be great enough to overcome the motor spring means. The motor means also has a length of stroke which is limited to a small fraction of the stick reach or motion.

The seismic device 18 is positioned laterally with respect to the longitudinal axis of the fuselage or craft spaced from the center of gravity C.G. of the fuselage so that it is responsive or resonant to the fuselage instability frequency. The control vector needed to damp the hub oscillations should be in phase with the hub oscillation velocity, that is, when the hub is midway in its range of movement. An undamped seismic weight which is tuned to the half frequency of rotor r.p.m. would lag about 90 degrees but the damping control vector should lag the signal from the seismic device by about another 15°. This may vary with rotor design. The weight lag should be reduced to 75° which is accomplished by damping the weight one half critically. This weight damping can be achieved by a longitudinal close fit of the weight in the oil filled housing 19.

The rotor hub damper described operates in the following manner. Fluid oil is pumped constantly from pump P through restrictions 38 pipes 35 and 36, valve conduits and ports 25 and 26 into the housing 19 and out of the outlet 22 which is connected with an oil reservoir. The oil also fills the two chambers of the fluid motor 31 and the pressure is the same in each chamber so that the cylinder is stationary. With the continuous flow of fluid through the partially open valves, the pressure in the pipes 35 and 36 is less than the pressure capable of being delivered by the pump. When the weight 20 moves to the left (L) in the housing 19, metering valve 24 closes or substantially closes, depending upon the extent or vigor of the fuselage oscillation, and valve 26 opens fully or substantially fully. Full or increased oil pressure is developed in pipe 35 and the left hand chamber of the motor 30 connected therewith and at the same time the fluid pressure decreases in pipe 36 and the right hand chamber of the motor because of the open valve 26. As a consequence the motor cylinder 31 moves to the left and displaces push rod 43 downwardly and swash plate downwardly. Push rod 43 is located laterally with respect to the fuselage for a left control movement.

Movement of the weight to the right (R) closes or substantially closes valve 26 and opens or substantially opens valve 24 to increase fluid pressure in the right hand chamber of the motor, reduce pressure in the left hand chamber so that the cylinder moves to the right to lengthen the linkage 45, 41 and raise the push rod 43 for a right control. The swash plate and its blade feathering control of the blades of the rotor provides the vector force to damp the hub oscillations.

FIGS. 2 to 4 show another form of seismic device 50 which can be substituted for that of FIG. 1. It includes a housing 51, a weight 52 mounted in the housing for movement or oscillation therein and spring means centralizing the weight within the housing chamber 55. The spring means includes a spring 53 at one end of the weight and a spring 54 at the other end of the weight. The weight is connected with a first valve or valve rod 56 at one end thereof and slidable in a bore 57 and connected with a second valve or valve rod 58 and slidable in a bore 59. Preferably the valve rods are attached to the weight forming a part thereof and one rod extends from opposite ends of the weight. A pin 60 carried by the weight is received in a slot 61 in the housing to retain the weight against turning. The slot also serves as an oil outlet from the housing to an oil reservoir.

The valves 56 and 58 may terminate at the end of its rod, however, in order to minimize oil effect on the tuning of the seismic weight and assure that pressure on the ends of the rods would not affect weight oscillation, the valves preferably are of the shuttle type, FIG. 2A, with a reduced diameter stem 62 and a terminal end 63. The enclosed cavity at the end of each valve bore is suitably vented, not shown, so that fluid is not trapped therein or pressures developed therein.

The housing has a fluid inlet conduit 64 which is connected with a pump P when assembled so that fluid pressure is supplied through an inlet port 65 to the bore 57 and through an inlet port 66 to the bore 59. These inlet ports are restricted and the equivalent of restrictions 38 to decrease pressures in the line and motor chamber when the valve opens the outlet port. The first outlet port or orifice 67, FIG. 3, connects the bore 57 to a bleed or outlet port 69 into the housing through a conduit 68. A second outlet port 70 connects the bore 59 to the bleed or outlet port 69 by the conduit 68. The outlet ports 67 and 70 provide lubricating oil to the seismic weight housing but serves a more important purpose as will appear. The port 67 is closed by the valve 56 and outlet port 70 is closed by valve 58 when the weight is in central position, which differs from the seismic device of FIG. 1 in that full pump pressure is applied to the motor 30. The seismic weight is one half critically damped to provide an additional 15 degree lag in the damping vector applied to the rotor hub which weight damping may be secured by a close fit of the weight with the housing wall or by a close fit of the valve rods in their bore or by both. The outlet ports 67 and 70 need not be connected with the housing weight chamber but it is a desirable way to lubricate the housing for free movement of the weight therein.

A fluid motor port 73 opens from the bore 57 and is connected by a pipe 74 to one chamber of the motor cylinder 31, such as the right hand chamber, and a similar port 75 opens from the bore 59 and is connected by a pipe 76 with the other chamber of the motor cylinder 31. The pipe 74 is the equivalent of pipe 35 and pipe 76 is the equivalent of pipe 36. In central position of the weight, the outlet ports 67 and 70 are closed so that full pump pressure is applied in both chambers of the motor 30 from conduit 64, inlet port 65, outlet port 73 and pipe 74 to the left side chamber of the motor and from conduit 64, inlet port 66, outlet port 75 and pipe 76 to the right hand chamber of the motor. Movement of the weight 52 and valve or valve rod 56 to the right opens outlet port 67 for release of fluid and pressure through conduit 68, motor port 69, housing 51 and outlet slot 61 which reduces pressure in pipe 74 and the left hand chamber of the motor cylinder 31. Full pressure, however, is maintained in the right hand chamber so that the cylinder 31 is pressed to the right to lengthen the linkage formed by the piston, piston rod and a cylinder and raise the swash plate push rod 43 and inject a right control into the swash plate and provide a vector force to dampen the hub oscillation. Movement of the weight 52 and valve or valve rod 58 to the left opens outlet port 70, reduces fluid pressure in the right hand chamber of the motor cylinder 31 which moves to the left to contract or shorten the linkage 32, 41, 45 to propel the push rod 43 downwardly. This movement injects a left control into the swash plate and thereby provides a vector force to the rotor hub to dampen its oscillations. These vectors which dampen the rotorcraft oscillations are applied to the hub in phase with the maximum velocity of the hub oscillation which occurs at the midpoint of the range of hub oscillation.

In order to reduce orifice velocity effect, the orifices or inlet ports 65, 66 should extend from the bottom of the seismic housing 51, the bleed or outlet ports 67, 69, 70 should be forward and the motor cylinder ports 73, 75 should be aft of the housing.

The rotor hub damper illustrated and described is effective to damp oscillations of the rotorcraft at a frequency of approximately half of the rotor r.p.m. or less which is frequency of the aeromechanical instability. For hub oscillations having a frequency of rotor r.p.m. the phase lag of the vector will be greater and hence its damping effect is small. For hub oscillations having a frequency which is a multiple of rotor r.p.m. the vector lag is greater still and damping is ineffective for these frequencies. Frequencies between 0 and the tuned frequency of the seismic damper the lag of the damping vector will be 0° to 75° so that damping will be weaker as well as the response of the weight hence the damping device will be inactive for long period harmonics and weak accellerations but will be effective or respond to abrupt lateral oscillations of the fuselage.

The damping device described herein may control or feed its damper effect into a servo device 79. Although the damping device is illustrated as connected in series or directly in the linkage between stick and swash plate, it may be connected in parallel therewith mechanically such as a whiffletree arrangement or hydraulically such as in my U.S. Pat. No. 2,687,856. The invention is described as an hydraulic system, however, the seismic device may control other elements other than valves which in turn control the elongation and contraction of a connecting element in the linkage to the swash plate.

The invention fills a need for improvements in a Damping Means for the Hub of the Rotor of a Rotorcraft and its combination with the Rotorcraft. Various modifications may and often do occur to those skilled in the art especially after benefiting from the teachings herein. The preferred means of embodying the invention in useful form is disclosed.

What is claimed is:

1. An oscillation damper for the hub of a rotor of a rotorcraft having blades extending outwardly from the hub with the pitch of the blades being controlled by a swash plate which rotor is adapted to be rotated at a cruising r.p.m. comprising a seismic device having a housing, a weight mounted for movement in the housing, weight spring means engaging the weight and maintaining the weight in central position in the housing, the weight and its spring means being tuned to the frequency of the lateral aeromechanical instability or approximately at one half of the r.p.m. of the rotor at cruising speed, weight damping means one half critically damping the response of the weight to secure a vector force lag of approximately 15°, control means connected with the weight and controlled by the movement thereof including a first controller and a second controller, an extendable and contractable motor means connected with the control means and controlled by the movement of the first controller to expand the motor means and controlled by the movement of the second controller to contract the motor means, and connecting means carried by the motor means and adapted to be connected with a swash plate.

2. An oscillation damper as in claim 1 in which the damping means for the weight is a close fit between the weight and the housing.

3. A rotorcraft and an oscillation damper as in claim 1 in combination comprising a fuselage having a center of gravity, a swash plate having a lateral and a longitudinal location thereon and adapted to be connected with the blades of a rotor, a pilot stick, a connecting linkage between the stick and a lateral position on the swash plate, the motor means being connected in the linkage, the seismic device being secured to the fuselage in a lateral direction to be responsive to lateral motion of the fuselage and spaced from the center of gravity of the fuselage.

4. An oscillation damper as in claim 1 in which the motor means is a fluid motor with a cylinder member and a piston member, the piston member dividing the cylinder member into two chambers, motor spring means centralizing the piston member in the cylinder member, in which the first controller is a first fluid valve and the second controller is a second fluid valve both of which are operatively connected with the weight, the first valve having a fluid connection with one chamber of the motor and the second valve having a fluid connection with the other chamber of the motor, an outlet connection for each valve controlled by its valve so as to at least open the first valve upon movement of the weight in one direction from the central position and to at least open the second valve upon movement of the weight in the opposite direction from central position, and an inlet for a pump connected with one valve and one chamber and connected with the other valve and the other chamber, the motor spring means being stiff enough to have small deflection relative to normal forces applied to the stick by the pilot, and the motor having a stroke limited to a small fraction of the stick reach.

5. An oscillation damper as in claim 4 in which the outlet connection for each valve is connected with the housing, and a fluid outlet from the housing.

6. An oscillation damoer as in claim 4 in which the valves are in partial open position with the weight in central position, the first valve moving towards closed position and the second valve opening wider for movement of the weight in one direction from central position, and the second valve moving towards closed position and the first valve opening wider for movement of the weight in the other direction from central position.

7. An oscillation damper as in claim 4 in which the outlet for each valve is closed by the valve with the weight in central position.

8. An oscillation damper as in claim 7 in which the valve outlet for each valve is connected with the housing, and a fluid outlet from the housing.

9. An oscillation damper as in claim 8 in which the fluid connection from the valves to the fluid motor is on one side of the valves and the outlet connection for the valves is on the other side of the valves and in the same plane as the fluid connection to the fluid motor.

10. An oscillation damper as in claim 4 including a fluid restriction in each connection between the pump inlet and the valves.

11. An oscillation damper as in claim 7 in which the first valve is a valve rod projecting from one end of the weight and the second valve is a valve rod projecting from the other end of the weight.

12. A rotor craft and hub oscillation damper as in claim 4 in combination in which the rotorcraft has a pylon and a rotor rotatably mounted on the pylon, the rotor having a hub and outwardly extending blades comprising a fuselage having a center of gravity and a lateral direction and a fore and aft direction, the seismic device being mounted on the fuselage in a lateral direction for lateral movement of the weight in response to lateral movement of the fuselage, the seismic device being spaced from the center of gravity of the fuselage. A swash plate carried by the pylon and having a lateral location and a fore and aft location to control the feathering of the blades, and the rotor means being connected with the swash plate at a lateral location thereof.

13. A rotor craft and hub oscillation damper combination as in claim 12 in which the damping means for the weight is a close fit between at least a part of the weight and the housing.

14. A rotor craft and hub oscillation damper combination as in claim 12 in which the outlet connection for each valve is connected with the housing, and a fluid outlet from the housing.

15. A rotor craft and hub oscillation damper combination as in claim 12 in which the outlet for each valve is closed by the valve with the weight in central position.

16. A rotor craft and hub oscillation damper combination as in claim 13 in which the outlet for each valve is closed by the valve with the weight in central position.

17. A rotor craft and hub oscillation damper combination as in claim 15 in which the fluid connection from the valves to the fluid motor is on one side of the valves, the outlet connection for each valve being on the opposite side of the valves and in the same plane as the fluid connection to the motor, and the fluid connection with the motor is located on the aft side of the housing.

18. A rotor craft and hub oscillation damper as in claim 12 including a fluid restriction in each connection between the pump inlet and the valves.

* * * * *